United States Patent
Jourdren et al.

(10) Patent No.: US 9,911,538 B2
(45) Date of Patent: Mar. 6, 2018

(54) ENERGY STORAGE ASSEMBLY COMPRISING AN ELECTRICALLY INSULATING ELASTIC RING

(71) Applicant: BLUE SOLUTIONS, Ergue Gaberic (FR)

(72) Inventors: Arnaud Jourdren, Ergue Gaberic (FR); Eric Baylard, Le Relecq Kerhuon (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 256 days.

(21) Appl. No.: 14/386,336

(22) PCT Filed: Mar. 21, 2013

(86) PCT No.: PCT/EP2013/055963
§ 371 (c)(1),
(2) Date: Sep. 18, 2014

(87) PCT Pub. No.: WO2013/139924
PCT Pub. Date: Sep. 26, 2013

(65) Prior Publication Data
US 2015/0044525 A1    Feb. 12, 2015

(30) Foreign Application Priority Data

Mar. 21, 2012  (FR) ...................................... 12 52536

(51) Int. Cl.
*H01M 2/08* (2006.01)
*H01M 2/04* (2006.01)
(Continued)

(52) U.S. Cl.
CPC ................ *H01G 9/10* (2013.01); *H01G 9/08* (2013.01); *H01G 9/12* (2013.01); *H01G 9/145* (2013.01);
(Continued)

(58) Field of Classification Search
CPC .......... H01M 2/02–2/0495; H01M 2/12–2/185
See application file for complete search history.

(56) References Cited

U.S. PATENT DOCUMENTS

| 3,489,616 A | 1/1970 | Fangradt et al. |
| 3,502,948 A | 3/1970 | Crouch et al. |

(Continued)

FOREIGN PATENT DOCUMENTS

| CN | 201904219 U | 7/2011 |
| FR | 2894381 A1 | 6/2007 |

(Continued)

*Primary Examiner* — Jonathan Crepeau
*Assistant Examiner* — Jacob Buchanan
(74) *Attorney, Agent, or Firm* — Womble Bond Dickinson (US) LLP

(57) ABSTRACT

The invention concerns an electrical energy storage assembly (capacitor or battery) comprising: -an envelope (20) including: *at least one lateral wall (21), and *an open end, -an electrochemical element (30) intended to be contained in the envelope (20) and -at least one cover (40) intended to be positioned at the open end of the envelope (20), each cover (40) including: *a cover wall (41, 45) intended to cover the open end of the envelope (20), *a lateral face (42, 43) at the periphery of the cover wall (41, 45) and intended to be facing the lateral wall (21) of the envelope (20), -at least one electrically insulating elastic annular ring (50) intended to be positioned between the lateral wall (21) of the envelope (20) and the lateral wall (42, 43) of the cover (40).

17 Claims, 6 Drawing Sheets

(51) Int. Cl.
*H01M 10/052* (2010.01)
*H01G 9/10* (2006.01)
*H01G 9/08* (2006.01)
*H01G 11/78* (2013.01)
*H01G 11/82* (2013.01)
*H01M 2/12* (2006.01)
*H01G 9/12* (2006.01)
*H01G 9/145* (2006.01)
*H01G 11/58* (2013.01)
*H01G 11/80* (2013.01)
*H01G 11/84* (2013.01)
*H01M 10/058* (2010.01)
*H01M 2/02* (2006.01)

(52) U.S. Cl.
CPC ............ *H01G 11/58* (2013.01); *H01G 11/78* (2013.01); *H01G 11/80* (2013.01); *H01G 11/82* (2013.01); *H01G 11/84* (2013.01); *H01M 2/08* (2013.01); *H01M 2/12* (2013.01); *H01M 2/1229* (2013.01); *H01M 10/052* (2013.01); *H01M 2/022* (2013.01); *Y02E 60/13* (2013.01); *Y10T 29/417* (2015.01); *Y10T 29/49108* (2015.01)

(56) References Cited

U.S. PATENT DOCUMENTS

| | | |
|---|---|---|
| 4,063,902 A | 12/1977 | Heinz, Jr. |
| 4,494,174 A | 1/1985 | Schroeder |
| 6,033,795 A * | 3/2000 | Broussely ............... H01M 6/10 429/231.1 |
| 2007/0015046 A1* | 1/2007 | Kim .................... H01M 2/0413 429/53 |
| 2008/0268336 A1* | 10/2008 | Jeon .................... H01M 2/0225 429/182 |
| 2009/0274948 A1* | 11/2009 | Calderone ........... H01M 2/0404 429/50 |
| 2010/0079927 A1 | 4/2010 | Shimizu et al. |
| 2010/0136419 A1* | 6/2010 | Kwak ................. H01M 10/425 429/164 |
| 2012/0021276 A1* | 1/2012 | Takatsuka ........... H01M 10/052 429/163 |
| 2012/0114989 A1* | 5/2012 | Caumont ................ H01G 9/10 429/61 |
| 2013/0122358 A1* | 5/2013 | Maeda ................ H01M 2/0413 429/185 |

FOREIGN PATENT DOCUMENTS

| | | |
|---|---|---|
| FR | 2979473 A1 | 3/2013 |
| GB | 604458 A | 7/1948 |
| GB | 1178859 A | 1/1970 |
| JP | S 58-031668 U | 8/1956 |
| JP | S 61-174170 U | 10/1986 |
| JP | 2000-182590 A | 6/2000 |
| JP | 2001015391 A | 1/2001 |
| JP | 2002329485 A | 11/2002 |
| JP | 2004079469 A | 3/2004 |
| JP | 2005-026090 A | 1/2005 |
| JP | 2008311370 A | 12/2008 |
| WO | WO 2007065748 A1 * | 6/2007 ............... H01G 9/10 |
| WO | WO 2011145595 A1 * | 11/2011 ........... H01M 2/0413 |

* cited by examiner

- - PRIOR ART - -

ENERGY STORAGE ASSEMBLY COMPRISING AN ELECTRICALLY INSULATING ELASTIC RING

The present invention relates to the general technical field of electrical energy storage assemblies.

Within the scope of the present invention, "electrical energy storage assembly" means either a capacitor (i.e. a passive system comprising two electrodes and an insulator), or a supercapacitor (i.e. a system including at least two electrodes, an electrolyte and at least one separator), or a battery of the lithium battery type (i.e. a system comprising at least one anode, at least one cathode and an electrolyte solution between the anode and the cathode). The terms "electrochemical element" or "capacitive element" are used hereafter to designate the portion of the assembly allowing actual storage of energy.

GENERAL PRESENTATION OF THE PRIOR ART

An example of an energy storage assembly of the tubular supercapacitor type is illustrated in FIG. 1. This energy storage assembly includes a tubular case 20 open at both ends, a capacitive winding 30 and a liquid electrolyte contained in the tubular case 20, and two covers 40 intended to cap the open ends of the tubular element 20. The covers are generally attached to the case by gluing. The case and the covers are for example made of a metal such as aluminium.

The storage assembly further includes an electrically insulating intermediate part 10 between each cover and the case. The intermediate part 10 can be made of a rigid or semi-rigid polymer and is generally forcibly pressed onto the cover or onto the case during assembly of the storage assembly.

This intermediate part 10 makes it possible to ensure electrical isolation between the case and each cover. It also makes it possible to prevent the adhesive from penetrating inside the case during assembly of the storage assembly.

One disadvantage of such a storage assembly is that its manufacture is dimensionally very restrictive. In fact, accuracy as regard the dimensions of the case, of the cover and of the intermediate part must be very great to allow correct assembly of the storage assembly.

Another disadvantage of this storage assembly relates to the risks of deforming the intermediate part due to the variations in temperature undergone by the different elements constituting the storage assembly during its assembly. In fact, there is no low-cost polymer in existence having a coefficient of expansion close to that of aluminium. For this reason, there is a risk of expansion and lifting of the intermediate part under the influence of a strong variation in temperature. In the event that lifting occurs, the intermediate part no longer holds back the glue, which can then enter the case and cause disruptions in performance.

One object of the present invention is to propose a storage assembly and an assembly process for such an assembly allowing compensation of the aforementioned disadvantages.

PRESENTATION OF THE INVENTION

To this end, an electrical energy storage assembly is provided including:
at least one case including:
  at least one side wall, and
  at least one open end,
an electrochemical element intended to be contained inside the case and
at least one cover intended to be positioned at the or at one of the open ends of the case, each cover including:
  a covering wall intended to cover the open end of the case,
  a side wall at the perimeter of the covering wall and intended to face the side wall of the case,
notable in that the storage assembly further includes at least one electrically insulating elastic annular ring intended to be positioned between the side wall of the case and the side wall of the cover.

Preferably, the ring is made of a material having a coefficient of expansion near that of aluminium.

The use of an elastic annular ring has numerous advantages. It makes it possible to provide the same functions as the intermediate part 10 of the prior art storage assemblies—to with electrical isolation of the cover and the case, on the one hand, and a barrier for the glue on the other hand—and also makes it possible to compensate for assembly clearances connected with possible variations in dimensions of the cover and of the case.

Preferred but not limiting aspects of the storage assembly according to the invention are the following:
  the material constituting the ring is an elastomer, particularly EPDM
  the material constituting the ring is a foam, an elastomeric foam for example,
  the ring is split over its entire height. It is then the possible deformation of the ring which gives the same its elasticity. In this case, the split can have a complex shape (S shaped, crenellated, etc.),
  the storage assembly further includes at least one degassing channel defined between the ring and the case and/or between the ring and the cover to allow passage of gas between the interior and the outside of the storage assembly,
  in a first embodiment, the ring has the shape of a tube, said ring including at least one recess extending over the entire longitudinal dimension of the ring on at least one of its faces, each recess forming a degassing channel with the side wall of the cover or of the case. The recess preferably extends along the longitudinal direction of the ring,
  the case or the cover can also or alternatively have, on one face of its side wall intended to face the ring, at least one recess extending at least partially in the longitudinal dimension of the side wall, each recess forming a degassing channel with the ring. "Extending at least particularly in the longitudinal direction" means that the recess extends along a path which has at least a longitudinal component, particularly in the longitudinal direction of the side wall. It also extends over a dimension greater than or equal to the dimension of the ring in this longitudinal direction,
  the ring can also have the shape of a tube, said ring including at least one pin extending radially over at least one of its faces, each pin defining at least partially a degassing channel with the side wall of the cover or of the case. In fact, the pin locally separates the ring from the wall, the space formed in the vicinity of this pin corresponding to the degassing channel,
  the side wall of the cover or of the case can also include at least one pin extending radially over its face intended to face the ring, each pin defining at least partially a degassing channel with the face of the ring intended to face said side face, the side wall of the cover or of the case can also include a recess intended to accommodate the ring, the case or the cover includes a positioning groove, on a face intended to face the ring. This groove is in particular a peripheral groove and makes it possible to press the ring against the other element to ensure good clamping of the ring between these two elements. The ring can also include a channel complementary to the positioning groove to accommodate it, the ring has a pointed section over at least one of its faces to that contact of the ring with the cover or the case is a line type contact. This makes it possible to facilitate the insertion of the ring on the case or the cover. The profile of the ring can in particular be a symmetrical profile (rhombus type profile), the ring includes at least one tab extending in the longitudinal direction of the ring and locally extending it in said direction. It is thus possible to reduce locally the height of the glue inserted between the cover and the case (the glue being insertable only in the absence of the ring), and create local mechanical weaknesses so as to be better able to separate the cover and the case if necessary, the side walls of the cover and of the case between which is positioned the ring are parallel over the entire area at which they are in contact with the ring. Preferably, each of these walls has a rectilinear profile in the longitudinal direction of the assembly in this area, to with being completely free of protrusions or of cavities. It is in fact not necessary in the invention to deform one or the other of the side walls in order to compress the ring and the walls can therefore remain parallel and of simple design, the assembly further includes glue positioned between the side walls of the cover and of the case, so that the ring is positioned on the path that the glue must take in order to come into contact with the electrochemical element located inside the case. In other words, when the side wall of the cover is surrounded by the side wall of the case, the path from the outside of the assembly to come into contact with the electrochemical element is rectilinear and the glue is closer to the free end of the assembly than the seal. On the other hand, when the side wall of the cover surrounds that of the case, the path from outside of the assembly to come into contact with the electrochemical element forms a U, the bottom whereof consists of the longitudinal end of the assembly, the seal then being closer to the longitudinal end of the assembly than the glue.

The invention also relates to a process for assembling an electrical energy storage assembly including at least one case including at least one side wall and at least one open end, an electrochemical element and at least one cover including a covering wall and a side wall at the perimeter of the covering wall, the process including at least the following steps:

positioning the electrochemical element inside the case, positioning the cover on the open face of the case, notable in that it further includes a step consisting of positioning an elastic electrically insulating annular ring between the cover and the case.

Preferred but not limiting aspects of the process according to the invention are the following:

The steps consisting of positioning the cover and the ring can include the following sub-steps:

positioning the ring on the side wall of the cover, positioning the group consisting of the ring and the cover on the open end of the case.

They can also include the following sub-steps:

positioning the ring on the side wall of the case, positioning the cover on the group consisting of the ring and the case;

or preferably the following sub-steps:

positioning the cover on the open end of the case, positioning the ring between the side face of the cover and the side face of the case, particularly by forcible insertion.

It will be noted that the process does not include a step consisting of deforming one of the side walls following insertion of the ring, because it is not necessary to compress the ring to achieve a perfectly sealed assembly, said ring participating in sealing only temporarily until the glue is placed on the assembly.

The glue is inserted between the cover and the case once the ring, the cover and the case are positioned relative to one another. It is then heated to polymerise it. The glue thus participates in sealing the assembly.

PRESENTATION OF THE FIGURES

Other features, objects and advantages of the present invention will also arise from the description that follows, which is purely illustrative and not limiting and must be read with reference to the appended drawings wherein.

DESCRIPTION OF THE INVENTION

Different embodiments of the storage assembly according to the invention and its manufacturing process will now be described with reference to the figures. In these different figures, the equivalent elements of the storage assembly bear the same numerical references.

Figure 1:
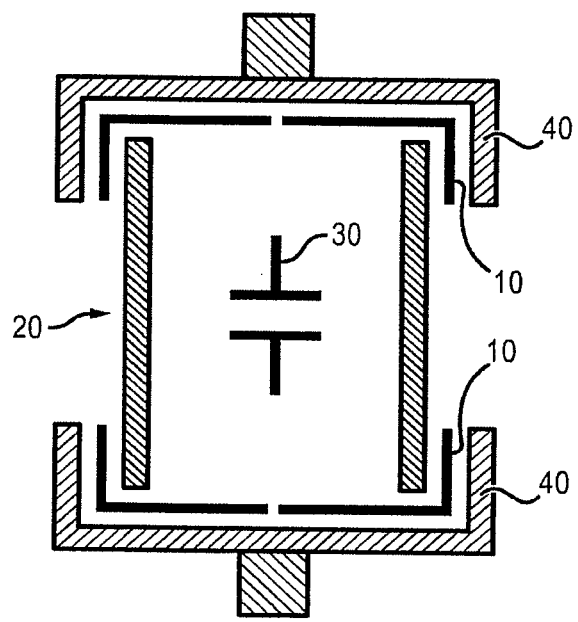
FIG. 1 shows an embodiment of a prior art storage assembly.
Figure 2:
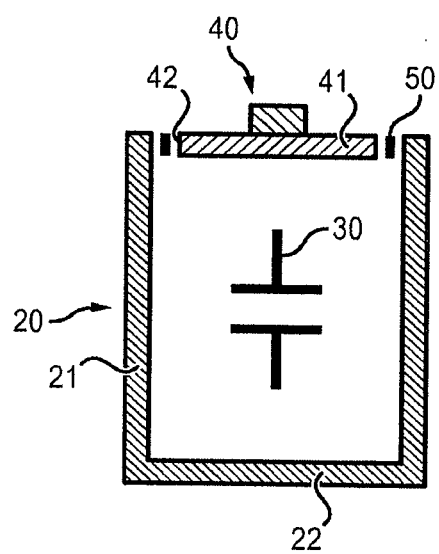
FIGS. 2, 3, 7 and 9 illustrate schematically different embodiments of an energy storage assembly according to the invention.

With reference to FIG. 2, a variant embodiment of a storage assembly according to the development is shown. The storage assembly includes a case 20, an electromechanical, or capacitive, element 30 and a cover 40.

The case 20 consists of a cylindrical side wall 21 open at one of its ends, and of a bottom wall 22 at its other end. It constitutes a housing for the capacitive element 30.

The cover 40 is intended to be positioned at the open end of the case 20. The cover 40 includes a covering wall 41 and a side wall 42 at the perimeter of the covering wall. The covering wall 41 is intended to cover the open end of the case 20. The side wall 42 is intended to face the side wall 21 of the case 20.

The electrochemical element 30 consists for example of two complexes and an electrically insulating separator between the two complexes. Each complex includes a current collector and at least one electrode. Each electrode can be made of activated carbon, a conductive additive and one (or more) polymer(s) providing for binding the two foregoing constituents. This electrode is then coated or extruded onto the current collector. It constitutes the active material of the complex. The material constituting the current collector is for example aluminium, nickel, copper or stainless steel. The material of the current collector is selected for its chemical and electrochemical inertness with respect to the constituents of the electrode of the electrolyte. The complexes and the separator can be rolled together in a spiral to form a wound element. This wound element is then impregnated with aqueous or organic electrolyte. This electrolyte includes ions and is electrically conductive.

The positive electrode(s) of the capacitive element is (are) electrically connected to the cover. The negative electrode(s) of the capacitive element is (are) electrically connected to the case.

Advantageously, the storage assembly further includes an electrically insulating annular ring 50 having the general shape of a tube open at both ends. This ring 50 is intended to be positioned between the cover 40 and the case 20, coaxially with the case. In the embodiment illustrated in FIG. 2, the ring 50 is arranged between the side wall 42 of the cover 40 and the inner face of the side wall 21 of the case 20. This ring makes it possible to electrically isolate the case from the cover. This ring also makes it possible to prevent the glue from entering the interior of the case during the assembly phase of the storage assembly, as shown more clearly in FIG. 12.

The use of an annular ring 50 makes it possible to facilitate the assembly phase of the storage assembly while still providing the same functions as the intermediate part 10 used in the prior art storage assemblies.

Preferably, the annular ring 50 is elastic to facilitate its placement and its clamping between the case and the cover during the assembly phase. Moreover, the elasticity of the ring makes it possible to compensate for assembly clearances connected with uncertainty regarding the dimensions of the cover(s) and of the case.

Figure 4:
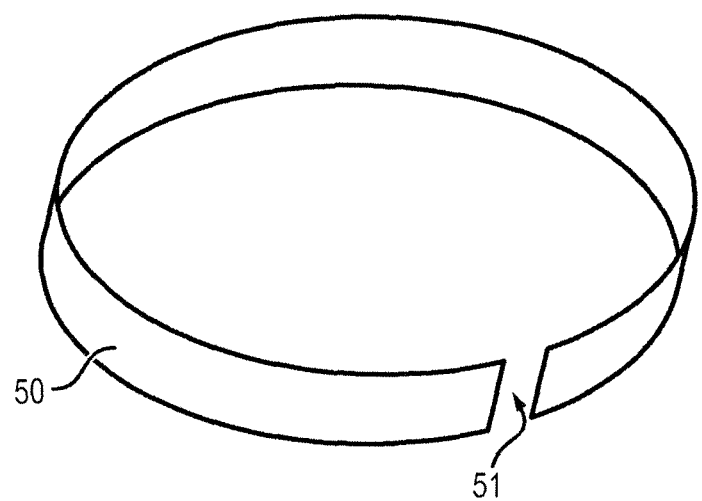
FIGS. 4, 5, 6 and 10 illustrate schematically different embodiments of an annular ring of a storage assembly according to the invention.

For example, the ring 50 can be made of an elastic or non-elastic material and include a slit 51—such as a diagonal slit, a curvilinear slit, etc.—over its entire height, as illustrated in FIG. 4. This slit 51 confers radial elasticity on the ring 50, allowing it to be inserted and to be held more easily on the cover 40.

As a variant, the ring can be made of an elastic material such as an elastomer. For example, the material constituting the ring can be ethylene-propylene-diene monomer (EPDM).

The dimensions of the ring are adapted to the dimensions of the cover and of the case. In particular, the inner diameter of the ring is provided slightly smaller than—or substantially equal to—the outer diameter of the cover. This makes it possible to ensure good clamping in position of the ring on the cover. Likewise, the outer diameter of the ring is provided slightly greater than—or substantially equal to—the inner diameter of the case. This makes it possible to ensure good clamping in position of the ring and the cover on the case.

The ring can have different profiles in cross-section. For example, the ring can have a circular or a polygonal profile section such as a quadrangular section. The thickness of the annular ring can be constant over its entire height, or be variable. For example, the ring can have a bi-conical shape (or pointed) shape tapering toward the longitudinal ends of the ring. As a variant, the ring can have areas with reduced thickness at its open ends. This makes it possible to reduce the contact area between the ring and the cover/case and thus to facilitate the insertion of the ring onto the cover and/or the case. It will be noted that a symmetrical profile such as a rhombus section advantageously allows an assembly orientation to be dispensed with (reversibility).

Figure 3:
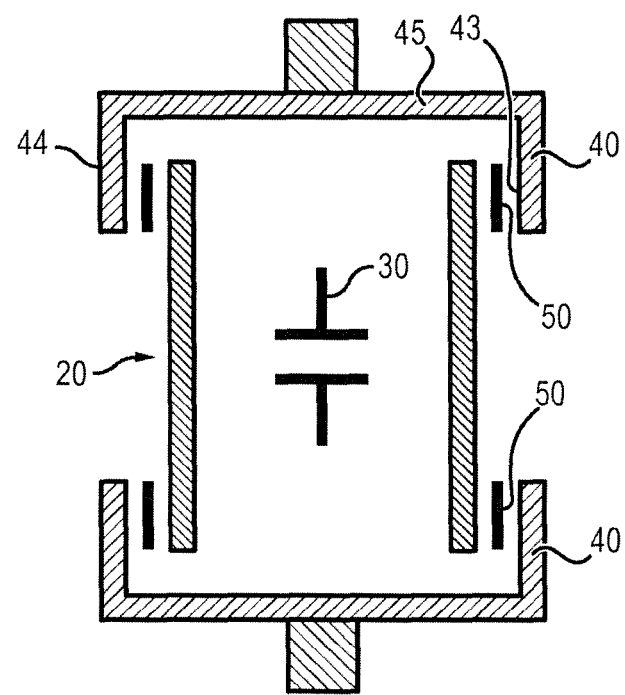

With reference to FIG. 3, another variant embodiment of the storage assembly according to the invention has been illustrated. The storage assembly includes a case, a capacitive element and two covers. As a variant, it will be noted that the assembly can include a case constituting a housing with a bottom and a cover placed only at one open end thereof.

The case consists of a cylindrical side wall open at both ends.

Each cover 40 is intended to be positioned at a respective open end of the case 20. Each cover 40 includes a covering wall 45 and a peripheral skirt 44 having a side wall 43. The covering wall 45 is intended to cover the open end of the case 20. The side wall 43 is intended to face the side wall 21 of the case 20 and to surround the same at its ends.

The storage assembly further includes two electrically insulating annular rings 50. Each ring 50 is associated with a respective cover and is positioned between the outer face of the side wall 21 of the case and the inner face of the side wall 43 of the cover.

The inner diameter of the ring 50 is provided slightly smaller than—or substantially equal to—the outer diameter of the case 20. This makes it possible to ensure good clamping in position of the ring 50 on the case 20. The outer diameter of the ring 50 is provided slightly greater than—or substantially equal to—the inner diameter of the peripheral skirt 44 of the cover 40. This makes it possible to ensure good clamping in position of the cover 40 on the ring 50 during the assembly phase of the storage assembly.

Two variant embodiments of the storage assemblies according to the invention have therefore been shown. In the first variant, the annular ring 50 surrounds the side wall 42 of the cover 40 and is in turn surrounded by the side wall 21 of the case 20. In the second variant, the ring 50 surrounds the side wall 21 of the case 20 and is in turn surrounded by the side wall 43 of the peripheral skirt 44 of the cover 40.

Whatever its embodiment, the storage assembly can include one (or more) glue degassing channel(s). This degassing channel makes it possible to exhaust any air trapped in the glue used during the assembly phase of the storage assembly.

As a variant, the annular ring 50 can be made of foam. This makes it possible to dispense with the presence of a degassing channel, air exhausting taking place in this case directly through the foam (in the case of an open-cell foam). It will be noted that a seal made with a closed-cell foam can also be considered within the scope of the invention.

The degassing channel can be located between the cover and the ring and/or between the ring and the case.

Figure 5A:
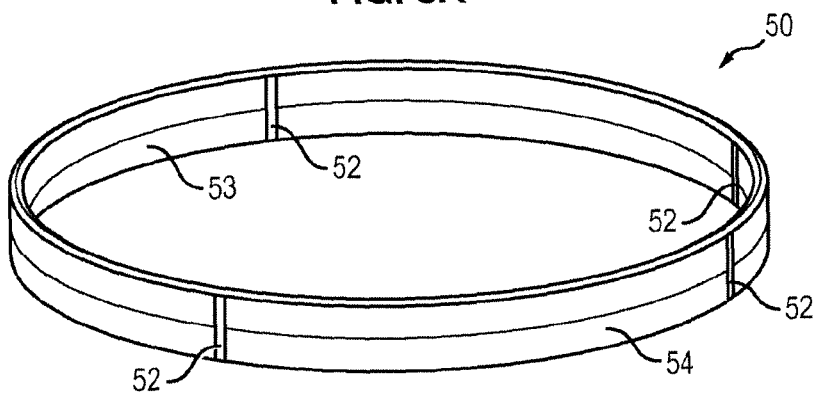
Figure 5B:
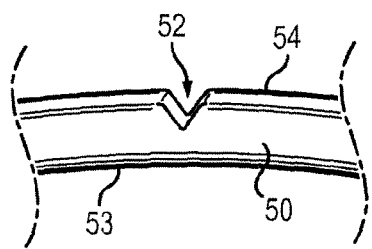
Figure 5C:
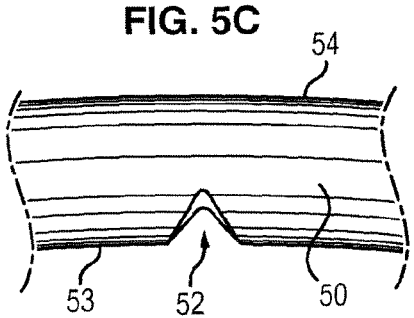
Figure 5D:
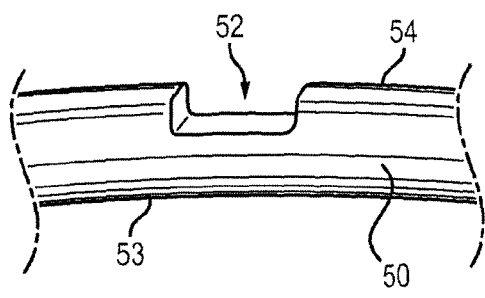
Figure 5E:
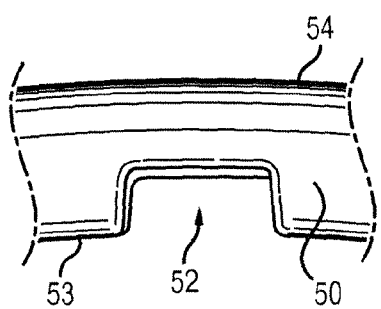

In the embodiment illustrated in FIGS. 5A through 5E, the degassing channel includes a recess formed in the annular ring 50 and extending over the entire longitudinal dimension of the ring. This recess can be a groove 52 extending over the entire height of the ring 50. This groove 52 can be provided on the outer face 54 of the annular ring 50 (FIGS. 5B and 5D) or on the inner face 53 of the annular ring 50 (FIGS. 5C and 5E). This groove 52 can have different shapes such as cylindrical, triangular, square, rectangular, etc. in cross-section in a plane perpendicular to the axis of revolution of the ring. Moreover, the dimensions and the number of grooves can vary.

With reference to FIG. 2, when the groove 52 extends over the inner face 53 of the ring 50, the groove 52 and the side wall 42 of the cover 40 form the degassing channel. When the groove 52 extends over the outer face 54 of the ring 50, the groove 52 and the side wall 21 of the case 20 form the degassing channel.

With reference to FIG. 3, when the groove 52 extends over the inner face 53 of the ring 50, the groove 52 and the side wall 21 of the case 20 form the degassing channel. When the groove 52 extends over the outer face 54 of the ring 50, the groove 52 and the side wall 43 of the peripheral skirt 44 of the cover 40 form the degassing channel.

Figure 6A:
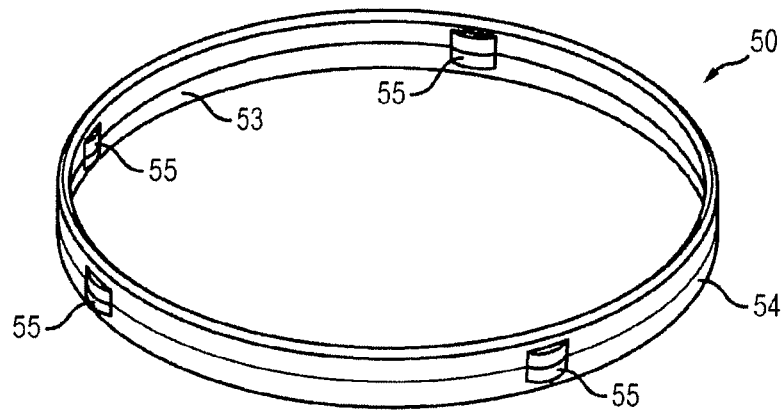
Figure 6B:
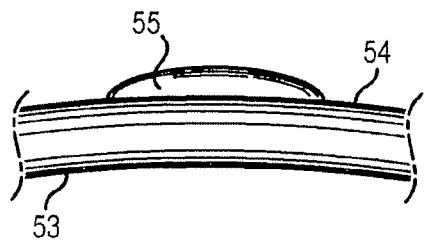
Figure 6C:
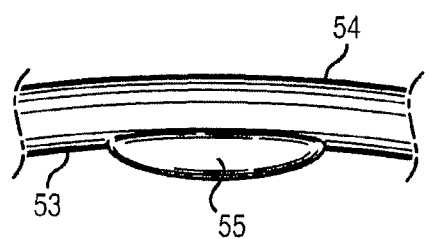

In the embodiment illustrated in FIGS. 6A through 6C, the degassing channel is defined at least in part by one (or more) pin(s) 55 extending radially. This pin 55 can be provided on the inner face 53 and/or on the outer face 54 of the annular ring 50. This pin allows the ring to separate from the side wall of the case or of the cover to define the degassing channel. A longitudinal channel is then formed on each side of the pin.

With reference to FIG. 2, when the pin 55 extends on the inner face 53 of the ring 50, the pin 55 and the side wall 42 of the cover 40 define the degassing channel. When the pin 55 extends on the outer face 54 of the ring 50, the pin 55 and the side wall 21 of the case 20 define the degassing channel.

With reference to FIG. 3, when the pin 55 extends over the 53 of the ring 50, the pin 55 and the side wall 21 of the case 20 define the degassing channel. When the pin 55 extends over the outer face 54 of the ring 50, the pin 55 and the side face 43 of the peripheral skirt 44 of the cover 40 form the degassing channel.

As a variant, the degassing channel can be formed by means of a groove or a pin arranged on the side wall of the case (on the inner face in the case of FIG. 2 and on the outer face in the case of FIG. 3) or on the side wall of the cover. In this case, the inner/outer face of the ring and the groove/the pin provided on the case/the cover define the degassing channel.

Figure 7:
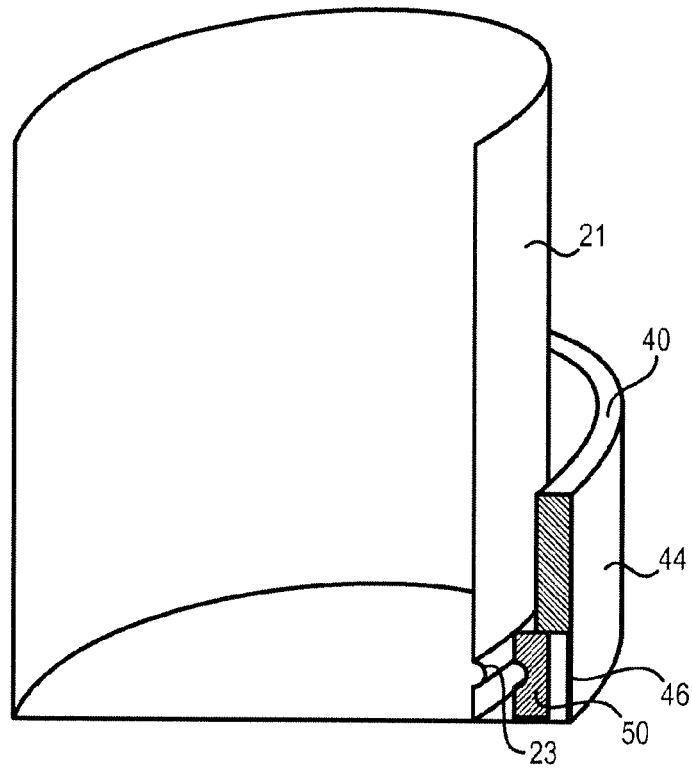

With reference to FIG. 7, an embodiment of the storage assembly has been illustrated wherein the cover 40 includes a peripheral skirt 44 including a gap 46 extending over the entire periphery of the inner face of the skirt 44. This gap 46 is intended to receive the annular ring 50. The gap 46 makes it possible to improve the clamping in position of the ring 50 during the assembly phase of the storage assembly. As a variant, the gap can be provided in the side wall of the case 20:
  on the inner face in the case of the storage assembly illustrated in FIG. 2, or
  on its outer face in the case of the storage assembly illustrated in FIG. 3.

In the embodiment illustrated in FIG. 7, the case 20 includes a groove 23 extending on the perimeter of the outer face of the side wall 21. This groove 23 is intended to compress the ring 50 and to press it against both the cover and the case. The groove 23 makes it possible to improve the clamping in position of the ring 50 on the case 20 during the assembly phase of the storage assembly. As a variant, the peripheral groove can be arranged on the inner face of the side wall of the cover 40. In any case, the groove can extend over the entire perimeter of the case/of the cover, or extend only over a portion of the case/of the cover.

Figure 10:
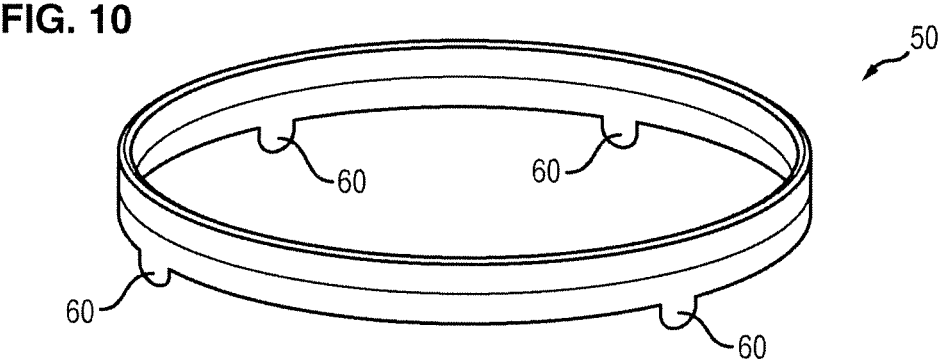
Figure 11:
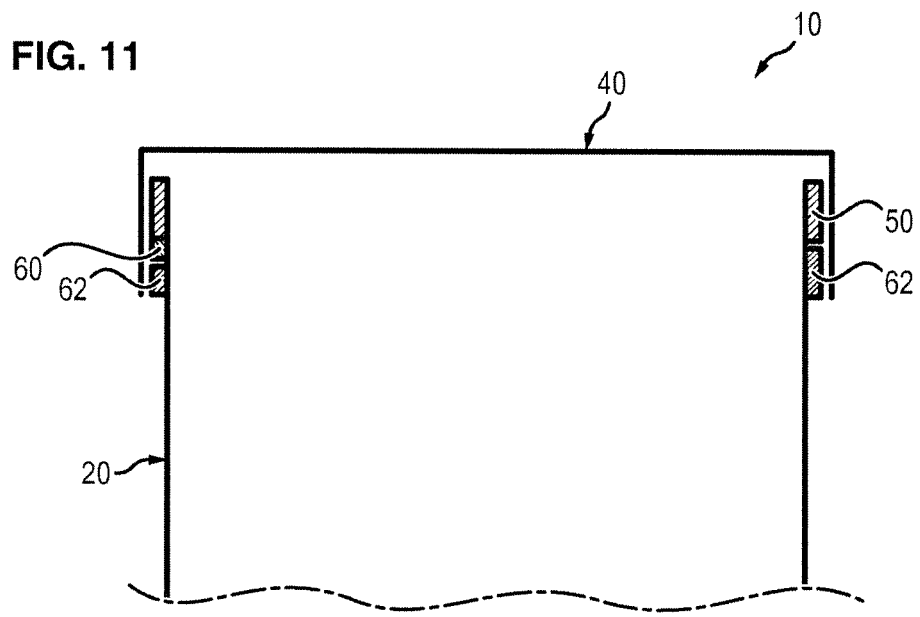
FIGS. 11 and 12 are section views of an energy storage assembly according to the embodiments of the invention of FIGS. 3 and 2 once glue has been placed on the storage assembly.

In the embodiment shown in FIG. 10, the ring 50 includes tabs 60 extending the ring locally downward in the longitudinal direction thereof. Such tabs cause a variation of the dimension (local increase) of the ring in the longitudinal direction. Thus, these tabs make it possible to control the height of the glue 62 between the cover and the case and to locally reduce it at the tabs, as is more clearly seen in FIG. 11. Mechanical weak spots are thus created at the case of the storage assembly, which makes it easier to separate the cover and the case if necessary.

An example of the assembly process for the energy storage assembly according to the invention will now be described in more detail.

Figure 8:
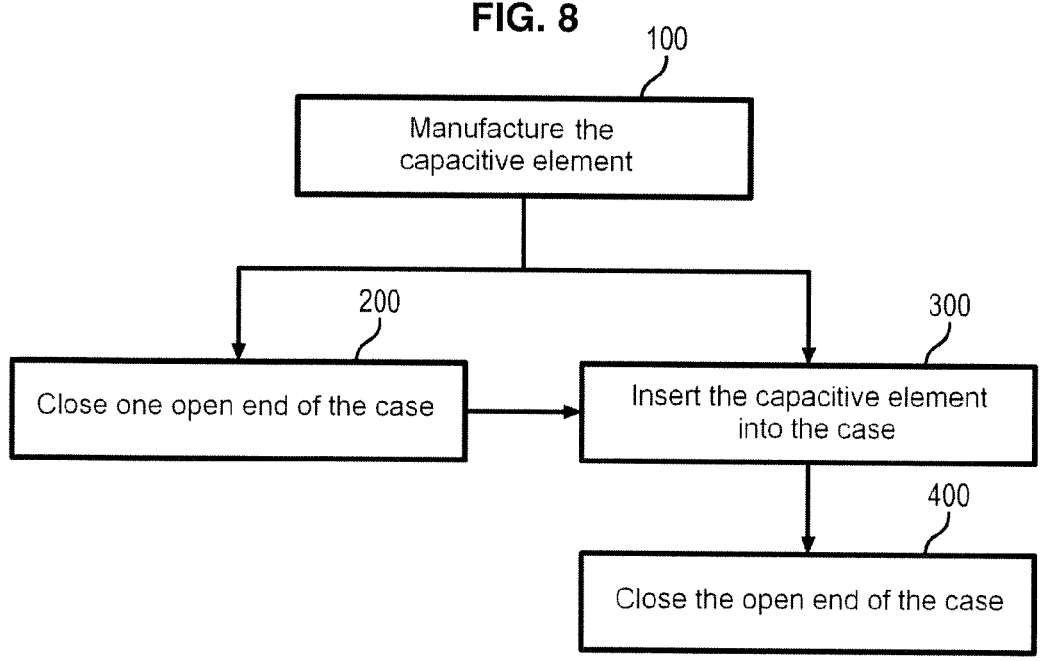
FIG. 8 is a diagram illustrating an example of an assembly process for an energy storage assembly according to the invention.

With reference to FIG. 8, the process includes a step 100 consisting of manufacturing the capacitive element 30. A separator is stacked on a first complex and a second complex is stacked on the separator so as to obtain a stack of two complexes between which is positioned the separator. The complexes and the separator are then rolled up together into a spiral to form a wound element. The wound element is impregnated with electrolyte so as to obtain the capacitive element 30.

In the case where the case 20 has a bottom 22, the next step 300 consists of inserting the capacitive element 30 into the case 20.

In the case where the case 20 is open at both ends, the process can include, prior to step 300 consisting of inserting the capacitive element 30 into the case 20, steps 200 consisting of:
  covering one of the ends of the case 20 with a cover 40,
  positioning a ring 50.

The ring 50 can be positioned on the storage assembly in different ways. For example, the ring 50 can be positioned on the cover 40 prior to assembly of the cover 40 onto the case 20. As a variant, the ring 50 can be positioned on the case 20 prior to assembly of the cover 40 onto the case 20. As another variant, the ring 50 can be positioned between the cover 40 and the case 20 following assembly of the cover 40 and the case 20.

The cover and the ring are then placed on the case. The glue is then placed between the cover and the case to glue the case and the cover. The ring is interposed between the end of the assembly and the glue. It is not bonded to the cover or to the case due to the glue. Indeed, due to its presence, the ring prevents passage of the glue. It is in fact on the path that the glue would need to take to come into contact with the capacitive element, said path forming a U of which the far wall of the cover constitutes the bottom.

Another step 400 of the process consists of closing the open end (or the other open end, in the event of the case 20 being open at both ends) of the case 20.

As previously described, the step 400 of closing the open end of the case 20 includes the positioning of the ring 50 and the positioning of the cover 40. The ring 50 can be positioned on the cover 40 or on the case 20 prior to assembly of the cover 40 into the case 20, or it can be positioned between the cover 40 and the case 20 after assembly of the cover 40 to the case 20 by gluing. In that case, the ring is inserted between the cover and the case using a lubricant that is chemically compatible with the electrolyte. Once the cover, the ring and the case are assembled, they are fastened together by gluing over the entire circumference of the case.

Figure 9:
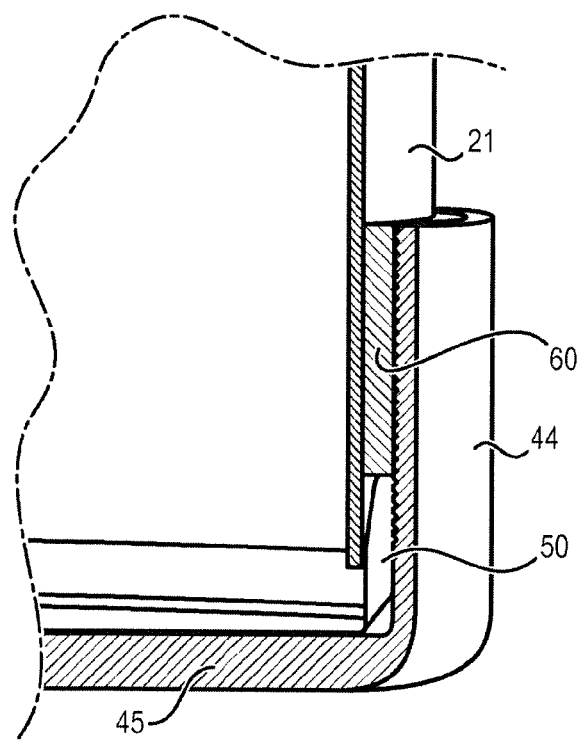

FIG. 9 partially illustrates an example of a storage assembly obtained by implementing the process described above. The storage assembly includes a case 20 including a side wall 21. The open end of the case 20 is capped by a cover 40 including a covering wall 45 and a peripheral skirt 44. The inner face of the peripheral skirt 44 faces the outer face of the side wall 21. An annular ring 50 is positioned between the side wall and the peripheral skirt. The geometry of the elastomer ring is developed to assume a position in the bottom of the cover 40 and to obstruct all or part of the glue 60 from overlying the ring 50.

Figure 12:
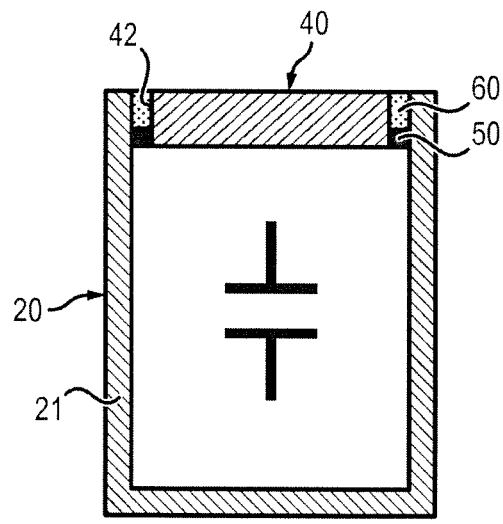

As a variant, as shown in FIG. 12, the cover 40 forms a solid cylinder positioned inside the case 20 so that the side wall 21 of the case 20 surrounds the side wall 42 of the cover. The ring 50 is inserted between the side walls 21, 42 so that it is located closest to the interior of the case. In this variant, the glue 60 is also inserted between the side walls 21, 42 so that it is situated closest to the free end of the assembly in the longitudinal direction thereof. The ring 50 is thus located on the path that the glue would have to follow to come into contact with the capacitive element.

The reader will have understood that numerous modifications can be applied to the storage assembly described previously and to its manufacturing process without substantially departing from the new teachings and from the advantages described here.

In particular, the capacitive element can be of cylindrical, prismatic or any other shape known to a person skilled in the art. Moreover, the case and the cover can also have different shapes such as oval, square, rectangular, etc. section shapes.

Consequently, all modifications of this type are included in the storage assembly as defined in the appended claims.

The invention claimed is:

1. An electrical energy storage assembly including:
   a case including:
      at least one side wall, and
      at least one open end,
   an electrochemical element contained in the case and
   at least one cover positioned at a corresponding one of the at least one of the open ends of the case, each cover including:
      a covering wall covering a corresponding one of the at least one open end of the case,
      a side wall on the perimeter of the covering wall facing a corresponding one of the at least one side walls of the case,
      an elastic electrically insulating annular ring positioned between the at least one side wall of the case and the side wall of the at least one cover, wherein the electrical energy storage assembly further includes a degassing channel disposed between at least one of a) the ring and the case, and b) the ring and the at least one cover, to allow the passage of gas between the interior and the outside of the storage assembly, wherein the side walls of the at least one cover and of the case between which the ring is positioned, are parallel over the entire area where they are in contact with the ring, and wherein the case or the at least one cover has, on one face of its side wall facing the ring and which is parallel to the side wall of the cover, respectively parallel to the side wall of the case, at least one recess extending at least partially along the longitudinal dimension of the side wall, each recess forming said degassing channel.

2. The storage assembly according to claim 1, wherein the material constituting the ring is an elastomer.

3. The storage assembly according to claim 2, wherein the material constituting the ring is ethylene-propylene-diene monomer.

4. The storage assembly according to claim 1, wherein the material constituting the ring is a foam.

5. The storage assembly according to claim 1, wherein the ring is split over its entire height.

6. The storage assembly according to claim 1 wherein the ring takes the form of a tube, said ring including at least one recess extending over the entire longitudinal dimension of the ring over at least one of its faces, each recess forming a degassing channel with the side wall of at least one of the at least one cover and the case.

7. The storage assembly according to claim 1, wherein the ring takes the form of a tube, said ring including at least one pin extending radially on at least one of its faces, each pin defining at least partially a degassing channel with the side wall of at least one of the at least one cover and the case.

8. The storage assembly according to claim 1, wherein the side wall of at least one of the at least one cover and the case includes at least one pin extending radially on the face intended to face the ring, each pin defining at least partially a degassing channel with the face of the ring facing said side face.

9. The storage assembly according to claim 1, wherein the side wall of the at least one cover and the case includes a gap to accommodate the ring.

10. The storage assembly according to claim 1, wherein at least one of the case and the at least one cover has a positioning groove facing the ring.

11. The storage assembly according to claim 1, wherein the ring has a pointed cross-section over at least one of its faces so that the contact of the ring with at least one of the at least one cover and the case is a line type contact.

12. The storage assembly according to claim 1, wherein the ring has at least one tab extending in the longitudinal direction of the ring and locally extending the same in that direction.

13. The storage assembly according to claim 1, wherein the side walls of the at least one cover and of the case between which the ring is positioned, are parallel over the entire area where they are in contact with the ring.

14. The storage assembly according to claim 1, also including a glue positioned between the side walls of the cover and of the at least one case so that the ring is positioned on the path that the glue must take to come into contact with the electrochemical element located in the interior of the case.

15. A process for assembling an electrical energy storage assembly including a case including at least one side wall and at least one open end, an electrochemical element, and at least one cover including a covering wall and a side wall at the perimeter of the covering wall, the process comprising:
   positioning the electrochemical element within the case,
   positioning the at least one cover on the open face of the case,
   positioning an annular elastic electrically insulating ring between the at least one cover and the case, wherein said process further includes positioning a degassing channel between at least one of a) the ring and the case and b) the ring and the at least one cover to allow the passage of gas between the interior and the outside of the storage assembly, wherein the side walls of the at least one cover and of the case between which the ring is positioned, are parallel over the entire area where they are in contact with the ring, the case or the at least one cover having, on one face of its side wall facing the ring and which is parallel to the side wall of the cover, respectively parallel to the side wall of the case, at least one recess extending at least partially along the longitudinal dimension of the side wall, each recess forming said degassing channel.

16. The process according to claim 15 wherein, once the at least one cover, the case and the annular ring are positioned, the process further includes:

placing a glue between the side walls of the case and the at least one cover and heating the glue so that said glue polymerises.

17. The process according to claim 15, wherein said positioning the annular ring is carried out following said positioning the at least one cover on the at least one open end of the case, said process further comprising positioning the annular ring by forcible insertion between the side walls of the at least one cover and the case.

\* \* \* \* \*